United States Patent
Tombelli et al.

(10) Patent No.: US 11,807,114 B2
(45) Date of Patent: Nov. 7, 2023

(54) POWER TRANSFER SYSTEM FOR ELECTRIC VEHICLES

(71) Applicant: ABB Schweiz AG, Baden (CH)

(72) Inventors: Fabio Tombelli, Terranuova Bracciolini (IT); Pawel Blaszczyk, Wieliczka (PL); Marco Lega, Montevarchi (IT); Oscar Apeldoorn, Langnau (CH)

(73) Assignee: ABB SCHWEIZ AG, Baden (CH)

( * ) Notice: Subject to any disclaimer, the term of this patent is extended or adjusted under 35 U.S.C. 154(b) by 596 days.

(21) Appl. No.: 17/048,694

(22) PCT Filed: Apr. 19, 2018

(86) PCT No.: PCT/EP2018/060076
§ 371 (c)(1),
(2) Date: Oct. 19, 2020

(87) PCT Pub. No.: WO2019/201444
PCT Pub. Date: Oct. 24, 2019

(65) Prior Publication Data
US 2021/0237593 A1 Aug. 5, 2021

(51) Int. Cl.
*B60L 53/12* (2019.01)
*H02J 50/80* (2016.01)
*H02J 50/12* (2016.01)
*B60L 53/30* (2019.01)
*B60L 3/04* (2006.01)

(52) U.S. Cl.
CPC ............... *B60L 53/12* (2019.02); *B60L 3/04* (2013.01); *B60L 53/305* (2019.02); *H02J 50/12* (2016.02); *H02J 50/80* (2016.02)

(58) Field of Classification Search
CPC .............................. B60L 53/12; B60L 53/305; B60L 3/04; H02J 50/80; H02J 50/12
USPC .......................................................... 320/108
See application file for complete search history.

(56) References Cited

U.S. PATENT DOCUMENTS

| | | | |
|---|---|---|---|
| 2015/0333530 A1* | 11/2015 | Moyer | H02J 5/00 307/104 |
| 2016/0006267 A1* | 1/2016 | Muratov | B60L 53/60 307/104 |
| 2017/0203656 A1* | 7/2017 | Okamoto | B60L 53/126 |

FOREIGN PATENT DOCUMENTS

EP  2985875 A1  2/2016

OTHER PUBLICATIONS

European Patent Office, International Search Report & Written Opinion issued in corresponding Application No. PCT/EP2018/060076, dated Jan. 11, 2019, 13 pp.

\* cited by examiner

*Primary Examiner* — Nathaniel R Pelton
(74) *Attorney, Agent, or Firm* — Greenberg Traurig, LLP

(57) ABSTRACT

A power transfer system for supplying electric power to a battery of an electric vehicle including an innovative communication architecture, which allows the implementation of advanced control functionalities to control the operation of said power transfer system.

20 Claims, 1 Drawing Sheet

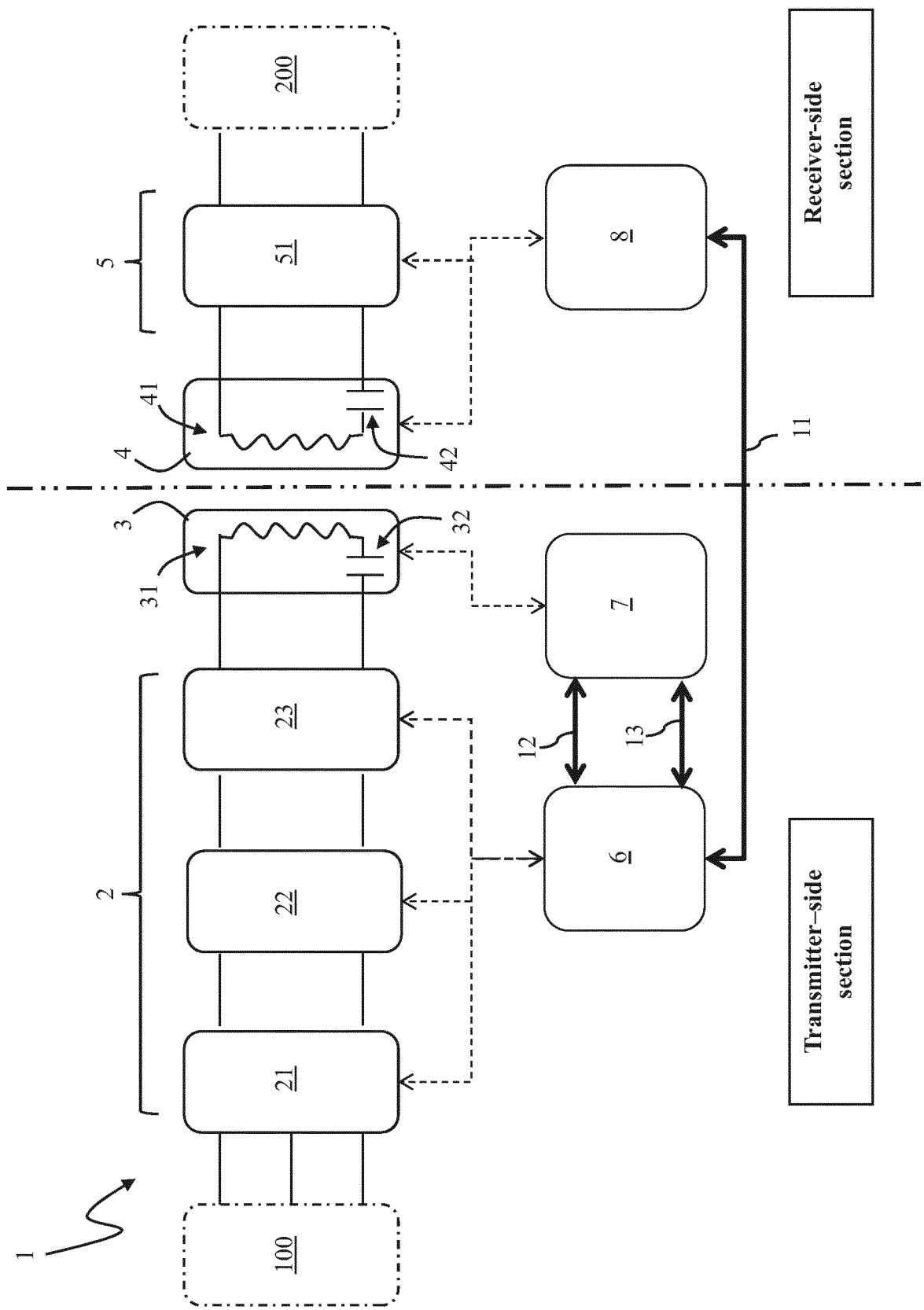

POWER TRANSFER SYSTEM FOR ELECTRIC VEHICLES

The present invention relates to the field of power transfer systems for electric vehicles. In particular, the present invention regards an inductive power transfer system capable of exchanging electric power between an electric power system and a battery on board an electric vehicle, in a wireless manner.

Wireless inductive power transfer systems for electric vehicles are well known in the state of the art. Typically, these systems are used to charge the electric battery of an electric vehicle. When used as battery charging systems, wireless inductive power transfer systems employ a transmitter coil, which is placed on or embedded in a ground surface, to inductively transmit electric power to a receiver coil mounted on board an electric vehicle through the air gap between the road surface and the vehicle itself.

As in traditional transformers, an AC current flowing in the winding of the transmitter coil produces a magnetic flux making an induced AC current to flow in the winding of the receiver coil. In this way, electric power may be inductively transferred from the transmitter coil to the receiver coil.

When used as battery charging systems, wireless power transfer systems for electric vehicles typically comprise a transmitter-side section, which normally includes the transmitter coil and a power supply system connectable to the mains to feed the transmitter coil, and a receiver-side section, which normally includes, on board the electric vehicle, the receiver coil and a power conversion system to feed the battery with electric power inductively received by the receiver coil.

Both the transmitter-side section and the receiver-side section of the power transfer system include a number of controllers to control their operation. Controllers arranged at different sections can mutually communicate through a dedicated communication channel, which is typically a wireless communication channel, e.g. of the Wi-Fi™ type.

In order to ensure a suitable charging process of the battery on board the electric vehicle, electric power transferred to the battery has to be properly controlled according to a battery charging profile that is typically set-up depending on the characteristics and state-of-charge of the battery and on other additional aspects, such as the reduction of the energy generation during a charging cycle, the reduction of the time required for the charging process, and the like.

Control arrangements currently used in power transfer systems of the state of the art often show poor performances in terms of reliability, in particular when safety control functionalities (e.g. carrying out a rapid shut-down in case of fault) are requested.

The main aim of the present invention is to provide a wireless power transfer system for electric vehicles, which allows overcoming the above-described disadvantages.

Within this aim, another object of the present invention is to provide a wireless power transfer system ensuring a suitable exchange of electric power between the electric power system and the battery on board an electric vehicle, in accordance with a given battery charging profile.

Another object of the present invention is to provide a wireless power transfer system ensuring good performances in terms of reliability, even when safety control functionalities are requested.

Another object of the present invention is to provide a wireless power transfer system relatively easy and inexpensive to arrange and produce at industrial level.

The above aim and objects, together with other objects that will be more apparent from the subsequent description and from the accompanying drawings, are achieved by a power transfer system for electric vehicles according to the following claim 1 and the related dependent claims.

In a general definition, the power transfer system, according to the invention comprises:
- a transmitter-side power sub-system electrically coupleable with said electric power system and adapted to exchange AC electric power with said electric power system;
- a transmitter-side coil sub-system electrically coupled with said transmitter-side power sub-system and adapted to exchange AC electric power with said transmitter-side power sub-system, said transmitter-side coil sub-system comprising a transmitter coil;
- a receiver-side coil sub-system comprising a receiver coil inductively coupleable with said transmitter coil, said receiver-side coil sub-system being adapted to exchange AC electric power with said transmitter-side coil sub-system;
- a receiver-side power sub-system electrically coupled with said receiver-side coil sub-system and adapted to exchange AC electric power with said receiver-side coil sub-system, said receiver-side power sub-system being electrically coupleable with said battery and adapted to exchange DC electric power with said battery;
- first control means adapted to control operation of said transmitter-side power sub-system, second control means adapted to control operation of said transmitter-side coil sub-system, third control means adapted to control operation of said receiver-side coil sub-system and receiver-side power sub-system and a first communication channel of the wireless type between said first and third control means.

The power transfer system, according to the invention, further comprises a second communication channel and a third communication channel between said first and second control means.

Said first and second control means are adapted to assign higher priority to data and commands exchanged through said second communication channel with respect to data and commands exchanged through said first communication channel or through said third communication channel.

Preferably, said first and second control means are adapted to overrule or disregard data and commands exchanged through said first communication channel or through said third communication channel, which are in in conflict with data and commands exchanged through said second communication channel.

Preferably, said first control means are configured to command a shut-down of said transmitter-side power sub-system, if communication with said second control means through said second communication channel is lost.

Preferably, said first control means are configured to command a reset of said first communication channel, if communication with said third control means through said first communication channel is lost for at least a period of time.

Preferably, said first control means are configured to command a shut-down of said transmitter-side power sub-system, if communication with said third control means through said first communication channel is not restored following the reset of said first communication channel.

Preferably, said first control means are configured to transmit data and commands to said third control means through said first communication channel, when said first control means transmit said data and commands to said second control means through said second communication channel.

Preferably, said first control means are configured to transmit data and commands to said third control means through said first communication channel, when said first control means receive said data and commands from said second control means through said second communication channel.

Preferably, said first control means are configured to feed said second control means through said second communication channel or said third communication channel.

Further characteristics and advantages of the present invention will be more apparent with reference to the description given below and to the accompanying FIGURES, provided purely for explanatory and non-limiting purposes, wherein FIG. 1 schematically illustrates the power transfer system, according to the present invention.

With reference to FIG. 1, the present invention refers to a power transfer system 1 for electric vehicles capable of exchanging electric power between an electric power system 100 (e.g. the mains) and a battery 200 on board an electric vehicle, in a wireless manner.

The power transfer system 1 is particularly adapted to be used as a battery charging system capable of transferring electric power harvested from the electric power system 100 to the battery 200 and it will be described with specific reference to this application for the sake of simplicity.

However, the power transfer system 1 may be suitable to implement bidirectional power transfer functionalities and therefore it may be employed to transfer electric power from the battery 200 to the electric power system 100.

The power transfer system 1 comprises a transmitter-side section and a receiver-side section, which respectively include a number of sub-systems and components arranged off-board and on-board the electric vehicle.

At the transmitter-side section, the power transfer system 1 comprises a transmitter-side power sub-system 2 electrically coupleable with the electric power system 100 and adapted to exchange AC electric power with this latter.

Preferably, the transmitter-side power sub-system 2 comprises a first AC/DC rectifying stage 21 electrically coupleable with the electric power system 100 and preferably comprising a filter and a switching converter electrically coupled in cascade (not shown).

Preferably, the first rectifying stage 21 includes power switches controllable by means of suitable control signals.

Preferably, the transmitter-side power sub-system 2 further comprises a DC-bus stage 22 electrically coupled with the first rectifying stage 21 and adapted to exchange DC electric power with this latter.

In some embodiments of the invention, the bus-stage 22 may comprise a capacitive circuit (e.g. a so-called DC-link circuit). In this case, the amplitude of the DC current and voltage at the DC bus-stage 22 may be controlled by suitably tuning the duty-cycle of the power switches of the first rectifying stage 21.

In alternative embodiments, the bus-stage 22 may include a DC-DC switching converter (e.g. a buck switching converter) that conveniently includes power switches controllable by means of suitable control signals. In this case, the amplitude of DC current and voltage at the DC-bus stage 22 may be controlled by suitably tuning the duty-cycle of the power switches of the said DC-DC switching converter.

Preferably, the transmitter-side power sub-system 2 further comprises a DC/AC inverter stage 23 electrically coupled with the first DC-bus stage 22 and adapted to exchange DC electric power with this latter.

Preferably, the inverter stage 23 comprises a DC/AC switching converter including power switches controllable by means of suitable control signals. In this way, the frequency of the AC current and voltage at the inverter stage 23 may be controlled by suitably tuning the frequency of the power switches of such an electronic stage.

At the transmitter-side section, the power transfer system 1 comprises a transmitter-side coil sub-system 3 electrically coupled the transmitter-side power sub-system 2 and adapted to exchange AC electric power with said transmitter-side power sub-system.

Preferably, the transmitter-side coil sub-system 3 is electrically coupled with the inverter stage 23.

The transmitter-side coil sub-system 3 comprises a transmitter coil 31, which is preferably adapted to receive an AC current provided by the inverter stage 23.

Preferably, the transmitter-side coil sub-system 3 comprises a first resonant capacitor 32 electrically coupled (e.g. in series as shown in FIG. 1) with the transmitter coil 31.

Preferably, the transmitter-side coil sub-system 3 comprises auxiliary circuits (not shown) operatively associated with the transmitter coil 31, e.g. electronic circuits including temperature sensors, interface electronic circuits and the like.

At the transmitter-side section, the power transfer system 1 comprises first control means 6 adapted to control operation of the transmitter-side power sub-system 2 and second control means 7 adapted to control operation of the transmitter-side coil sub-system 3.

Each control arrangement 6, 7 may include one or more controllers that may be variously arranged to control operation of electric or electronic components of the corresponding sub-system 2, 3.

As an example, the first control means 6 may include a controller to control the operation of the rectifying stage 21, another controller to control the operation of the bus stage 22 (when including a DC-DC switching converter) and a further controller to control the operation of the inverter stage 23.

As a further example, the second control means 7 may include a controller to control operation of the auxiliary circuits included in the transmitter-side coil sub-system 3.

In a preferred practical implementation of the invention, the transmitter-side power sub-system 2 is arranged in a wall-box device for an electric vehicle charging facility, e.g. for residential purposes. Such a wall-box device may conveniently include the first control means 6 operatively associated with the electronic stages of the transmitter-side power sub-system 2.

The transmitter-side coil sub-system 3 is instead arranged or embedded in a ground pad device for an electric vehicle charging facility, e.g. for residential purposes. Such a ground pad device may conveniently include the second control means 7 operatively associated to transmitter-side coil sub-system 3.

At the receiver-side section, the power transfer system 1 comprises a receiver-side coil sub-system 4 comprising a receiver coil 41 inductively coupleable with the transmitter coil 31.

When the transmitter coil 31 and the receiver coil 41 are inductively coupled (obviously with an air gap in therebetween), an AC current flowing along the transmitter coil 31 produces a magnetic flux making an induced second AC current to flow along the receiver coil 41 (and vice-versa).

In this way, electric power may be inductively exchanged between the transmitter coil 31 and the receiver coil 41.

The receiver-side coil sub-system 4 is thus adapted to exchange an AC electric power with the transmitter-side coil sub-system 3.

Due to magnetic coupling losses, electric power is exchanged between the transmitter coil 31 and the receiver coil 41 with efficiency values $\eta<1$.

Preferably, the receiver-side coil sub-system 4 comprises a second resonant capacitor 42 electrically coupled (e.g. in series as shown in FIG. 1) with the receiver coil 41.

Preferably, resonant capacitors 32, 42 are designed to form a resonant RLC circuit together with the inductance of transmitter and receiver coils 31, 41 and the equivalent impedance seen at the output terminals of the receiver-side coil sub-system 4.

In this way, by operating the inverter stage 23 so that the AC current flowing along the transmitter coil 31 has a fundamental frequency close or corresponding to the resonant frequency of such a resonant circuit, electric power may be exchanged between the transmitter-side coil sub-system 3 and the receiver-side coil sub-system 4 with high efficiency values despite of the necessarily large air gap between the transmitter coil 31 and the receiver coil 41.

Additionally, the amplitude of the AC flowing along the transmitter coil 31 can be reduced or minimized due to nearly-zero phase shift between said current and corresponding AC voltage.

Preferably, the receiver-side coil sub-system 4 comprises auxiliary circuits (not shown) operatively associated with the receiver coil 41, e.g. electronic circuits including temperature sensors, interface electronic circuits and the like.

At the receiver-side section, the power transfer system 1 comprises a receiver-side power sub-system 5 adapted to exchange AC electric power with the receiver-side coil sub-system 4.

Preferably, the receiver-side power sub-system 5 comprises a second rectifying stage 51 electrically coupled with the receiver-side coil sub-system 4.

Preferably, the second rectifying stage 51 includes a full-wave diode bridge electrically coupled in cascade with a filter (not shown).

As an alternative embodiment, the second rectifying stage 51 may include a switching converter and a filter (not shown) electrically coupled in cascade. In this case, the second rectifying stage 51 may include power switches controllable by means of suitable control signals.

The receiver-side power sub-system 5 is electrically coupleable with the battery 200 and is adapted to exchange DC electric power with this latter.

Preferably, the second rectifying stage 51 is electrically coupleable with the battery 200.

At the receiver-side section, the power transfer system 1 comprises third control means 8 to control operation of the receiver-side power sub-system 5 and of the receiver-side coil sub-system 4.

As an example, receiver-side controllers 7 may include a controller to control the operation of the rectifying stage 51 and of auxiliary circuits of the receiver-side coil sub-system 4.

In a preferred practical implementation of the invention, the receiver-side coil sub-system 4, the receiver-side power sub-system 5 and the third control means 8 are arranged (together with the battery 200) on board an electric vehicle.

According to the invention, the power transfer system 1 comprises a wireless first communication channel 11 between the first and third control means 6, 8.

As an example, the first communication channel 11 may be a communication channel adopting well-known wireless communication protocols such as Wi-Fi™, Bluetooth™, Zigbee™ and the like.

As a further example, the first communication channel may be a communication channel of the PLT (Power Line Technology) type. In this case, high frequency electric signals (e.g. in the range of KHz) may be inductively exchanged between the transmitter coil 31 and the receiver coil 41.

Conveniently, the first and third control means 6, 8 are adapted to exchange data and/or commands through the first communication channel 11, preferably to implement control functionalities to control operation of the power transfer system, e.g. control functionalities aimed at suitably controlling the exchange of electric power with the battery 200.

According to the invention, the power transfer system 1 comprises a second communication channel 12 between the first and second control means 6, 7.

Preferably, the first and second control means 6, 7 are adapted to exchange data and/or commands through the second communication channel 12 at relatively high speed-rates, e.g. in the range of 1 Mbps or higher, to implement control functionalities (e.g. safety control functionalities) for which data and commands has to be transmitted with a low latency time and a high transmission reliability.

As an example, the first and second control means 6, 7 may implement fast closed-loop control functionalities for controlling electric quantities at the transmitter-side power sub-system 2, e.g. for controlling DC voltages and currents provided by at least one of the rectifying stage 21 and the DC-bus stage 22 or for controlling the AC current provided by the inverter stage 23.

As a further example, the first and second control means 6, 7 may implement control functionalities for providing rapid shut-down functionalities of one or more electronic stages of the transmitter-side power sub-system 2 in case of faults at the transmitter-side coil sub-system 3.

As an additional example, the first and second control means 6, 7 may implement control functionalities for controlling physical quantities at the transmitter-side coil sub-system 2, e.g. for controlling operative temperatures of relevant components of the transmitter-side coil sub-system 3.

Preferably, the first and second control means 6, 7 are adapted to exchange predefined status signals through the second communication channel 12, which are indicative of corresponding operating conditions of the transmitter-side power sub-system 2 or the transmitter-side coil sub-system 3.

Preferably, said status signals are voltage signals having predefined voltage levels indicative of a corresponding operating conditions of the transmitter-side power sub-system 2 or the transmitter-side coil sub-system 3.

As an example, a given status signal may be a voltage signal having a voltage level of 0V, which may conventionally indicate the presence of a fault in the transmitter-side power sub-system 2, whereas another a further status signal may be a further voltage signal having a voltage level of 3.3V, which may conventionally indicate the presence of a fault in the transmitter-side coil sub-system 3.

According to alternative embodiments, the second communication channel 12 may adopt fast communication protocols for the digital transmission of information packets, such as CAN or SPI.

In principle, the second communication channel 12 may be of wired or wireless type, according to the needs.

In order to ensure higher immunity to noise, the second communication channel 12 is preferably of the wired type.

According to some embodiments of the invention, the second communication channel 12 may be a fiber-optic communication channel.

According to the invention, the power transfer system 1 comprises a third communication channel 13 between the first and second control means 6, 7.

Conveniently, the first and second control means 6, 7 are adapted to exchange data and/or commands through the third communication channel 13, preferably to implement control functionalities to control operation of the power transfer system 1, e.g. control solutions aimed at suitably controlling the exchange of electric power with the battery 200.

Preferably, the first and second control means 6, 7 are adapted to exchange data and/or commands through the third communication channel 13 to implement control functionalities (e.g. battery charging control functionalities) not necessarily requiring that data and commands are transmitted with a very short latency time. Data and/or commands may thus be transmitted at a relatively low speed-rates, e.g. in the range of 100 Kbps or lower, which are however fully compatible with the implementation of the above-mentioned control functionalities.

In principle, the third communication channel 13 may be of wired or wireless type, according to the needs.

In order to ensure higher immunity to noise, the third communication channel 13 is preferably of the wired type, more preferably a fiber-optic communication channel.

Conveniently, the third communication channel 13 may be a communication channel adopting well-known wired communication protocols such as RS485, CAN, Ethernet and the like.

According to the invention, the first and second control means 6, 7 are adapted to assign a higher priority to data and/or commands transmitted through the second communication channel 12 with respect to data and/or commands transmitted through the first communication channel 11 and/or third communication channel 13.

For the sake of clarity, it is specified that the feature that the first and second control means 6, 7 assign a higher priority to data and/or commands transmitted through the second communication channel 12 has to be intended in the sense that the first and second control means 6, 7 are adapted to execute their control functionalities primarily basing on said data and/or commands.

Preferably, the first and second control means 6, 7 are adapted to overrule or disregard data and/or commands transmitted through the first communication channel 11 and/or through the third communication channel 13, which are in conflict with data and/or commands transmitted through said second communication channel 12.

It is evident how the above-described solution allows effectively dealing with possible situations of conflicts between redundant data and/or commands transmitted through the second communication channel 12 and through the first and third communication channels 11, 13.

According to some embodiments of the invention, the first control means 6 are configured to command the shut-down of the electronic stages of the transmitter-side power sub-system 2, if communication with the second control means 7 through the second communication channel 12 is lost.

This solution provides relevant advantages in terms of safety and simplicity for the power management functionalities to be implemented. The transmitter-side power sub-system 2 is, in fact, deactivated, if it is not possible to receive data concerning the operative status of the transmitter-side coil sub-system 3 exchanging electric power with said transmitter-side power sub-system.

According to some embodiments of the invention, the first control means 6 are configured to operate for a certain period of time, even if communication with the third control means 8 through the first communication channel 11 is lost.

If communication with the third control means 8 is lost, the first control means 6 continue to operate for period of time, e.g. up to 0.1 s. During such a period of time, the first control means 6 may suitably adopt the last control variable or data values received from the third control means 8 to carry out their control functionalities.

When the above mentioned period of time is over, the first control means 6 command a reset of the first communication channel 11.

If communication with the third control means 8 through the first communication channel 11 is not restored following the reset of said first communication channel, the first control means 6 are configured to command a shut-down of the transmitter-side power sub-system 2.

Otherwise, if communication is suitably restored, the control means 6 keep on operating by suitably interacting with the third control means 8.

This solution provides a robust management of non-critical control functionalities (e.g. battery charging control functionalities) despite of possible failures of the first communication channel 11, which has a relatively low immunity to noise or disturbances as it is of the wireless type.

According to some embodiments of the invention, the first control means 6 are configured in such a way that they transmit data and/or commands to the third control means 8 through the first communication channel 11, when they transmit such data and/or commands to the second control means 7 through the second communication channel 12.

In practice, according to this solution, each time they transmit data and/or commands to the second control means 7 through the second communication channel 12, the first control means 6 conveniently transmit in parallel these data and/or commands to the third control means 8 through the first communication channel 11.

According to some embodiments of the invention, the first control means 6 are configured in such a way that they transmit data and/or commands through the first communication channel 11, when they receive such data and/or commands from the second control means 7 through the second communication channel 12.

In practice, according to this solution, each time they receive data and/or commands from the second control means 7 through the second communication channel 12, the first control means 6 conveniently route such data and/or commands to the third control means 8 through the first communication channel 11.

It is evident how the above-described solutions allow improving mutual interaction between the first, second and third control means 6, 7, 8. Obviously, this provides benefits in carrying out the control functionalities requested for the power transfer system.

According to some embodiments of the invention, the first control means 6 are configured feed the second control means 7 through the second communication channel 12 or said third communication channel 13. This solution apparently facilitates the arrangement of the second control means 7 as these latter can receive feeding power directly from the first control means 6 without the need of dedicated power supply circuits.

The power transfer system, according to the invention, allows achieving the intended aims and objects.

The power transfer system, according to the invention, includes an innovative communication arrangement between the control means arranged to control operation of its various sub-systems or stages, which makes easier the implementation of electric power exchange control functionalities with the battery on-board the electric vehicle and, at the same time, the implementation of fast responsive safety control functionalities.

The power transfer system, according to the invention, includes a communication channel through which a fast exchange of data and/or commands occurs between the control means operatively associated with the transmitter-side power sub-system and the transmitter-side coil sub-system.

Even if it does not provide high-level communication services, such a communication channel allows an easier implementation of the above-mentioned safety control functionalities by the control means operatively associated with the transmitter-side power sub-system and the transmitter-side coil sub-system.

In a preferred embodiment, the power transfer system, according to the invention, includes a further communication channel between the control means operatively associated with the transmitter-side power sub-system and the transmitter-side coil sub-system.

Such a further communication channel ensures a redundant exchange of data between the control means operatively associated with the transmitter-side power sub-system and the transmitter-side coil sub-system, which remarkably facilitates the implementation of control functionalities to control operation of the power transfer system.

Thanks to its innovative communication architecture, the power transfer system, according to the invention, ensures good performances in terms of reliability, even when safety control functionalities are requested to be implemented.

The power transfer system, according to the invention, can be easily arranged and produced at industrial level, at competitive costs with respect to similar systems of the state of the art.

The invention claimed is:

1. A power transfer system for exchanging electric power between an electric power system and a battery of an electric vehicle comprising:
    a transmitter-side power sub-system electrically coupleable with said electric power system and adapted to exchange AC electric power with said electric power system;
    a transmitter-side coil sub-system electrically coupled with said transmitter-side power sub-system and adapted to exchange AC electric power with said transmitter-side power sub-system, said transmitter-side coil sub-system comprising a transmitter coil;
    a receiver-side coil sub-system comprising a receiver coil inductively coupleable with said transmitter coil, said receiver-side coil sub-system being adapted to exchange AC electric power with said transmitter-side coil sub-system;
    a receiver-side power sub-system electrically coupled with said receiver-side coil sub-system and adapted to exchange AC electric power with said receiver-side coil sub-system, said receiver-side power sub-system being electrically coupleable with said battery and adapted to exchange DC electric power with said battery;
    first control means adapted to control operation of said transmitter-side power sub-system;
    second control means adapted to control operation of said transmitter-side coil sub-system;
    third control means adapted to control operation of said receiver-side coil sub-system and receiver-side power sub-system;
    a first communication channel of the wireless type between said first and third control means; and
    a second communication channel and a third communication channel between said first and second control means, said first and second control means being adapted to assign higher priority to data and/or commands exchanged through said second communication channel with respect to data and/or commands exchanged through said first communication channel and/or through said third communication channel.

2. The power transfer system, according to claim 1, wherein said first and second control means are adapted to overrule or disregard data and/or commands exchanged through said first communication channel and/or through said third communication channel, which are in conflict with data and/or commands exchanged through said second communication channel.

3. The power transfer system, according to claim 2, wherein said first control means are configured to command a shut-down of said transmitter-side power sub-system, if communication with said second control means through said second communication channel is lost.

4. The power transfer system, according to claim 3, wherein said first control means are configured to command a reset of said first communication channel, if communication with said third control means through said first communication channel is lost for at least a period of time.

5. The power transfer system, according to claim 4, wherein said first control means are configured to command a shut-down of said transmitter-side power sub-system, if communication with said third control means through said first communication channel is not restored following the reset of said first communication channel.

6. The power transfer system, according to claim 5, wherein said first control means are configured to transmit data and/or commands to said third control means through said first communication channel, when said first control means transmit said data and/or commands to said second control means through said second communication channel.

7. The power transfer system, according to claim 6, wherein said first control means are configured to transmit data and/or commands to said third control means through said first communication channel, when said first control means receive said data and/or commands from said second control means through said second communication channel.

8. The power transfer system, according to claim 3, wherein:
    said transmitter-side power sub-system and said first control means are arranged in a wall-box device for an electric vehicle charging facility;
    said transmitter-side coil sub-system and said second control means are arranged or embedded in a ground pad device for an electric vehicle charging facility;
    said receiver-side coil sub-system, said receiver-side power sub-system, said third control means and said battery are arranged on board said electric vehicle.

9. The power transfer system, according to claim 1, wherein said first control means are configured to transmit data and/or commands to said third control means through said first communication channel, when said first control means transmit said data and/or commands to said second control means through said second communication channel.

10. The power transfer system, according to claim 1, wherein said first control means are configured to transmit data and/or commands to said third control means through said first communication channel, when said first control means receive said data and/or commands from said second control means through said second communication channel.

11. The power transfer system, according to claim 1, wherein said first control means are configured to feed said second control means through said second communication channel and/or said third communication channel.

12. The power transfer system, according to claim 1, wherein said second communication channel is a wired communication channel.

13. The power transfer system, according to claim 12, wherein said second communication channel is an optic-fiber communication channel.

14. The power transfer system, according to claim 13, wherein said third communication channel is a wired communication channel.

15. The power transfer system, according to claim 14, wherein said third communication channel is an optic-fiber communication channel.

16. The power transfer system, according to claim 1, wherein said third communication channel is a wired communication channel.

17. The power transfer system, according to claim 16, wherein said third communication channel is an optic-fiber communication channel.

18. The power transfer system, according to claim 1, wherein:
said transmitter-side power sub-system and said first control means are arranged in a wall-box device for an electric vehicle charging facility;
said transmitter-side coil sub-system and said second control means are arranged or embedded in a ground pad device for an electric vehicle charging facility;
said receiver-side coil sub-system, said receiver-side power sub-system, said third control means and said battery are arranged on board said electric vehicle.

19. The power transfer system, according to claim 1, wherein said first control means are configured to command a shut-down of said transmitter-side power sub-system, if communication with said second control means through said second communication channel is lost.

20. The power transfer system, according to claim 1, wherein said first control means are configured to command a reset of said first communication channel, if communication with said third control means through said first communication channel is lost for at least a period of time.

* * * * *